United States Patent [19]

Weldon et al.

[11] Patent Number: 4,544,874
[45] Date of Patent: Oct. 1, 1985

[54] HOMOPOLAR GENERATOR POWER SUPPLY SYSTEM

[75] Inventors: William F. Weldon; John H. Gully, both of Austin, Tex.

[73] Assignee: The Board of Regents, The University of Texas, Austin, Tex.

[21] Appl. No.: 381,927

[22] Filed: May 26, 1982

[51] Int. Cl.$^4$ .......................... H02K 31/00; H02P 9/00
[52] U.S. Cl. ...................................... 322/10; 310/178; 310/242; 322/48
[58] Field of Search ................................ 322/8, 10–12, 322/38, 48, 100, 40; 310/242, 178

[56] References Cited

U.S. PATENT DOCUMENTS

| | | | |
|---|---|---|---|
| 4,200,831 | 4/1980 | Weldon et al. | 322/8 |
| 4,246,507 | 1/1981 | Weldon et al. | 310/178 X |
| 4,271,369 | 6/1981 | Stillwagen | 310/178 |
| 4,276,507 | 6/1981 | Stillwagen | 310/178 X |

OTHER PUBLICATIONS

Marshall, "High Current and High Current Density Pulse Tests of Brushes and Collectors for Homopolar Energy Stores," 26th Holm Conf. on Electrical Contacts, Sep. 29–Oct. 1, 1980.
Marshall and Weldon, "Parameter Selection for Homopolar Generators Used as Pulsed Energy Stores," *Electrical Machines and Electromechanics*, 6:109–127, 1981.
*Elektrotechnische Zeitschrift 73*, Annual vol. 3; Feb. 1, 1952, p. 76.

*Primary Examiner*—R. J. Hickey
*Attorney, Agent, or Firm*—Arnold, White & Durkee

[57] ABSTRACT

A high-energy, high-current homopolar generator pulsed power supply system that is compact and field portable. The power supply system includes a hompolar generator (HPG), an auxiliary supply and drive system, both mounted on a skid frame, and a control system coupled to the HPG and drive system. The homopolar generator has a split rotor with insulation between the halves and a recess in the periphery. A stator ring and field coil, for producing a magnetic field through which the rotor halves make two simultaneous voltage-generating passes, are disposed within the recess in the rotor. Air-actuated brush mechanisms inside and outside the recess contact surfaces of the rotor and collect discharge current. The auxiliary supply and drive system includes a motoring system comprising hydraulic motors for driving the HPG to speed, a bearing lubrication system, a generator for energizing the field coil, and a brush actuator air supply system, all of which are driven by a prime mover. The control system comprises a logic controller for executing a prescribed sequence of steps including turning on the prime mover, initiating motoring of the HPG, energizing the field coil, and initiating the discharge of electrical current.

10 Claims, 20 Drawing Figures

4,544,874

HOMOPOLAR GENERATOR POWER SUPPLY SYSTEM

BACKGROUND OF THE INVENTION

The present invention was made with Government support and the Government has rights in the invention pursuant to Dept. of Army Contract No. DAAK10-80-C-0309.

This invention was made at the Center for Electromechanics of the University of Texas at Austin with support from the Department of the Army.

The present invention relates to pulsed power supply systems; and more particularly it relates to high-energy (multi-MJ), high-current (MA), pulsed power supply systems using inertial energy storage with homopolar conversion.

Inertial energy storage with homopolar conversion is known to be useful as a pulsed power supply. Such a homopolar generator (HPG) is shown, for example, in U.S. Pat. No. 4,246,507. However, HPG power supplies have tended to be large, rather bulky, fixed laboratory installations.

An HPG, because it models electrically as a capacitor, admits to application as a power supply for electromagnetic (EM) propulsion systems for accelerating projectiles. Such EM propulsion systems include rail guns and launchers. In such applications, particularly rail guns, the power supply must be compact, and desirably is field portable. Prior HPG power supplies due to their relatively large physical dimensions are not satisfactory.

SUMMARY OF THE INVENTION

The present invention provides a compact pulsed power supply system utilizing a homopolar generator. By reason of its compactness, the power supply is field portable.

The power supply system provides a high-energy (multi-MJ), high-current (multi-MA) pulsed electrical output. The power supply is suitable for powering rail guns and the like. The power supply utilizes a homopolar generator (HPG) comprising a rotor split into halves insulated from one another and having a recess formed in the periphery. A stator and a field coil, for producing a magnetic field are disposed within the recess in the rotor. Further included in the HPG is means for collecting electrical discharge current from the rotor. An auxiliary supply and drive system is further included in the power supply. The auxiliary system comprises a prime mover for providing operating power, and includes a means for motoring the HPG to speed. A control system coupled to the HPG and the auxiliary supply system controls the operation of the HPG to obtain pulsed electrical power therefrom.

The control system includes a logic controller for executing a prescribed sequence of steps including turning on the prime mover, initiating motoring of the HPG, energizing the field coil, and initiating discharge of electrical current.

The motoring means for the HPG includes a hydraulic motor coupled to the rotor. A hydraulic circuit, including a hydraulic supply pump driven by the prime mover, controls the operation of the motor. To permit freewheeling of the motor during discharge of the HPG, the hydraulic circuit includes a relief valve bypassing the output of the supply pump.

The HPG may also include a bearing system to facilitate rotation of the rotor. The auxiliary supply and drive system may further include a bearing lubrication system.

The current collecting means in the HPG may be brush mechanisms pneumatically actuated into contact with the rotor. The auxiliary supply and drive system may further include a pneumatic control circuit for controlling the brush mechanisms.

BRIEF DESCRIPTION OF THE DRAWINGS

A written description setting forth the best mode presently known for carrying out the present invention, and of the manner of implementing and using it, is provided by the following detailed description of an illustrative HPG power supply embodiment shown in the attached drawings wherein.

DETAILED DESCRIPTION OF AN ILLUSTRATIVE EMBODIMENT

A. HPG Power Supply General Configuration

Figure 1:
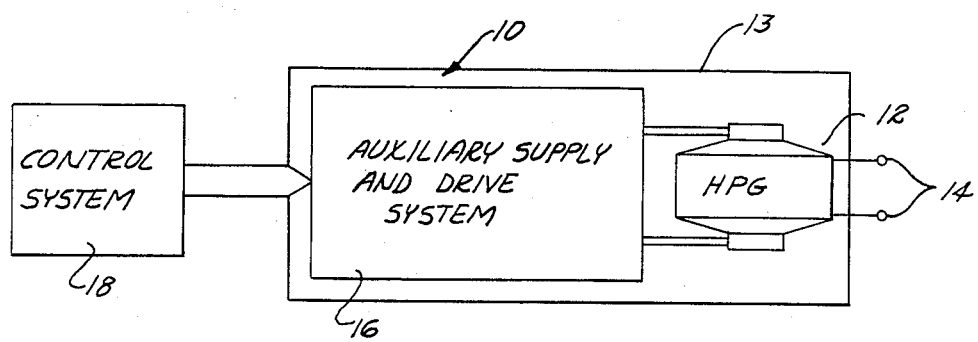
FIG. 1 is a schematic diagram illustration of the HPG power supply.

In FIG. 1, there is presented a diagrammatic illustration of a homopolar generator (HPG) power supply system 10 providing in a compact, field-portable package, a high-energy (multi-MJ), high-current (multi-MA) pulsed power supply.

HPG power supply system 10 comprises a homopolar generator (HPG) 12 in a single rotor configuration. Output pulsed power from HPG 12 is available at terminals 14. HPG power supply 10 further includes auxiliary supply and drive package 16 for driving HPG 12 to speed and for supplying the required auxiliaries to HPG 12. An instrumentation and control system 18 provides control for the various components of the system 10 and disarms HPG 12 if a fault occurs.

The drive package 16 and HPG 12 are preferably mounted on a skid 13. The control system is preferably provided in a stand-alone cabinet and connected by cable to the HPG and drive package.

B. HPG Power Supply Operating Parameters

As a single-rotor machine and for an operating outer slip ring speed of 220 m/s (6,200 r.p.m.), the electrical characteristics of HPG 12 are as summarized in Table I.

TABLE I

| | |
|---|---|
| Stored Energy | 6.2 MJ |
| Rotational Speed | 654 rad/s |
| Capacitance | 4,960 F |
| Internal Resistance | 7.5 |
| Internal Inductance | 0.03 H |
| Voltage | 50 V |
| Magnetic Flux Density | 2 T |
| Field Coil | 70,000 A-t |
| Armature Current | 750,000 A |

Figure 2:
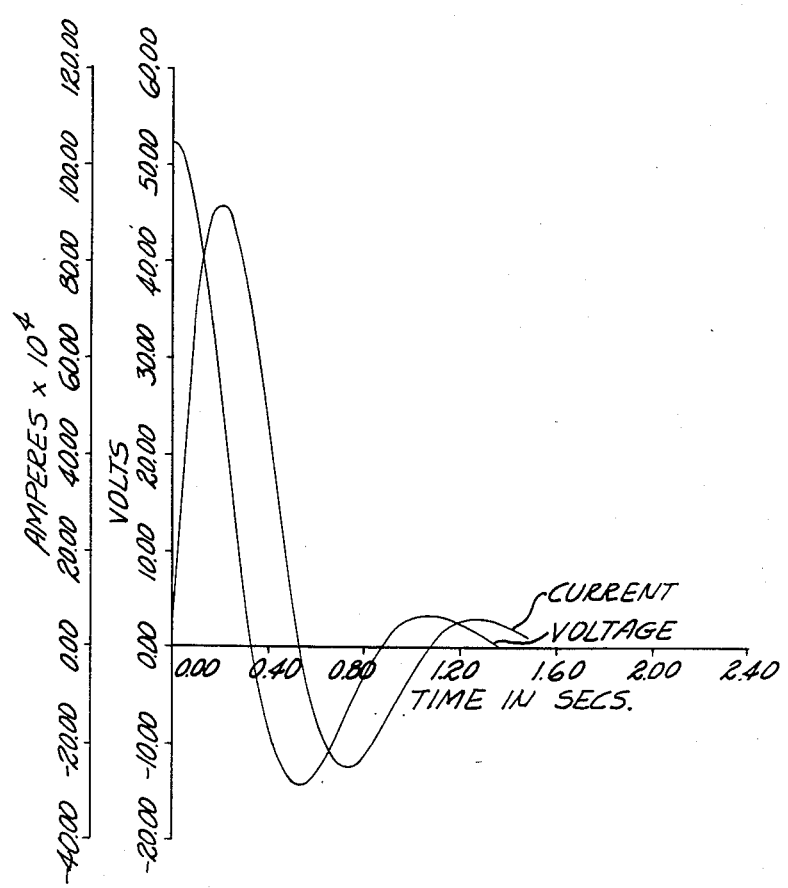
FIG. 2 is a graph of current and voltage versus time for the HPG power supply output upon charging of a specified load.

Referring now to FIG. 2, calculated curves of current and voltage versus time for HPG 12 when used to charge a load consisting of a 5.4 micro henry, 27 microohm inductive coil are shown.

C. Homopolar Generator Description 1. General

Figure 3:
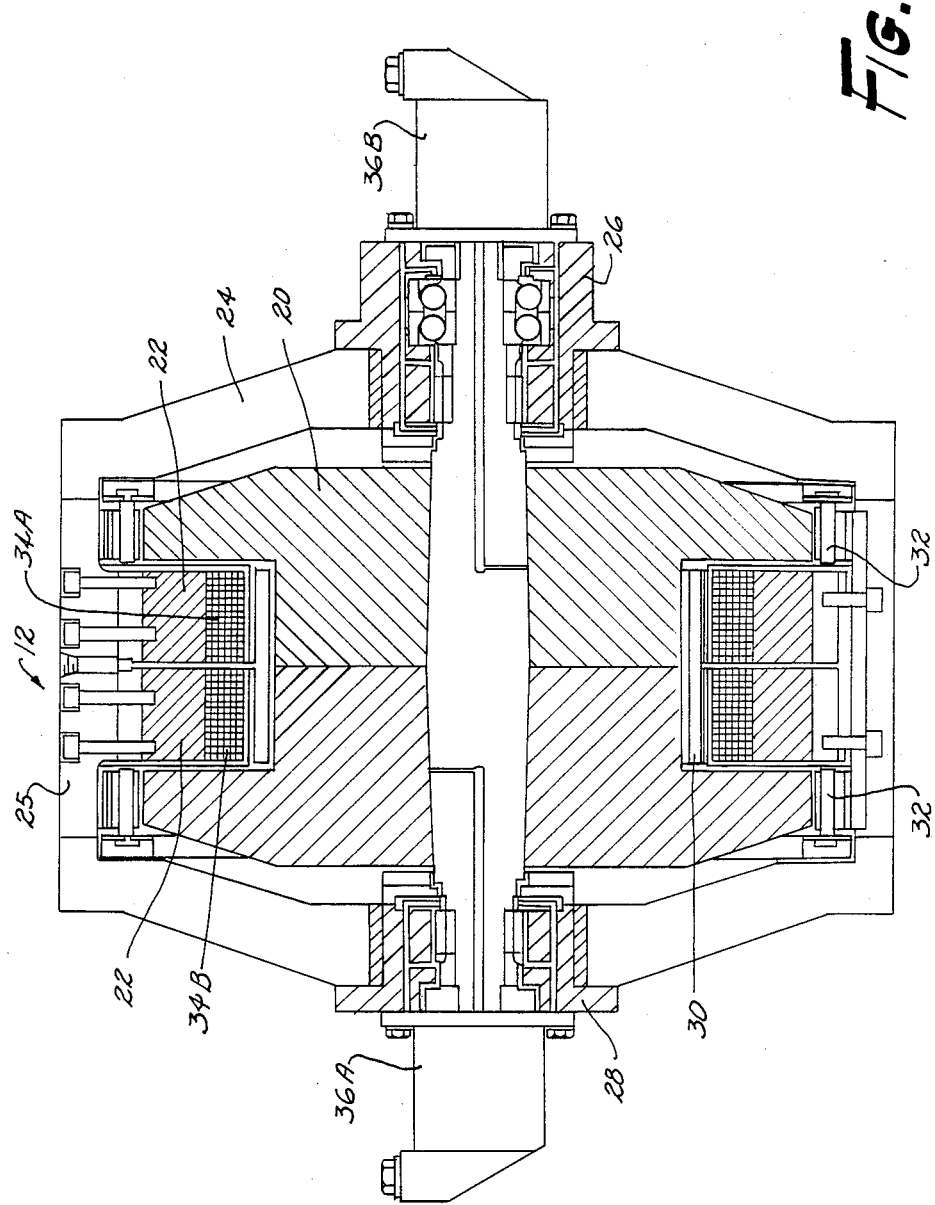
FIG. 3 is a cross-sectional view of the single rotor HPG used in the HPG power supply.

Referring to FIG. 3, HPG 12 is shown in cross-section. HPG 12 includes several major subassemblies, including: rotor-shaft assembly 20; stator 22; support structure 24; bearing systems 26, 28; inner brush mechanisms 30; outer brush mechanisms 32; and field coil 34. Also shown is motor 36 for driving HPG 12 up to speed.

The rotor is the primary element of the machine; it stores the energy inertially and converts it to electrical energy upon demand. Most of the fabrication labor involved in building this machine is applied to the stator assembly, which includes the field coils, brush mechanisms, conductors, ferromagnetic stator, and the support structure mounting the stator assembly relative to the rotor assembly. The brush mechanisms are subjected to extraordinarily difficult duty. The brushes must contact the rotor at its full diameter and thus at maximum surface speed. They must conduct extremely high currents at low voltage drops for maximum efficiency and minimum brush heating. They must operate in a relatively high magnetic field and thus are subjected to high J×B forces during discharge. The outer brushes are the making switch for the machine and must simultaneously contact the rotor while remaining completely clear of the rotor before being actuated. Finally, the brush mechanisms must minimize and reject heating due to friction, interface voltage drop, and joule losses in order to minimize brush wear. Requirements for the rotor assembly are that it be sufficiently stiff to allow operation at speeds up to 8,500 rpm without encountering a critical frequency while being lightweight and compact. Because HPG power supply 10 is to be field portable, rolling element bearings, with minimal hydraulic power requirements, are preferred. These bearings must be stiff; they are subjected to impact loads during a discharge and might have to operate in stray magnetic fields that could cause electrical pitting.

Auxiliaries for HPG 12 include motoring supplies, lubrication systems, field-coil power supplies, and brush actuation.

The total weight of HPG 12 is approximately 3,500 lbs, and the machine fits into a 0.86 m diameter, 0.91 m long cylinder, a volume of 0.53 m³.

2. Rotor Assembly

Rotor 24 in HPG 12 of the field portable power supply being described is suitably 68 cm in diameter, 40 cm thick, and shaped for a constant area magnetic flux path. Rotor 24 is preferably made of steel, and weighs about 1,500 lbs. Rotor 24 is supported radially by heavy-duty needle bearings and axially by angular contact ball bearings, which bearings are provided in bearing systems 26, 28.

The stator support structure 25 houses the stator 22, the inner brush mechanism 30 and the field coils 34 (FIG. 3). Therefore to assemble the machine, the rotor 20 must be split into halves and fitted around the stator. In addition, the ability to take the rotor halves apart at any time is needed to perform maintenance on either the field coils or the inner brush mechanism. Furthermore, the rotor halves must be insulated from each other to permit two voltage-generating passes through the externally applied magnetic field.

As the rotor is brought to speed in an HPG, the inner diameter (ID) of the rotor expands due to centrifugal forces. The shaft of the machine also experiences centrifugal growth, but not as much as the rotor ID. Consequently a relative growth is present between the shaft and rotor ID at operating speeds; this growth increases with the square of machine speed. Therefore, an initial interference between the shaft and rotor is required in order to maintain contact at operating conditions.

Heretofore, in most HPG machines, this initial interference is obtained by a thermal shrink fit of the shaft into the rotor. For shrink fitting, the shaft diameter is machined larger than the ID of the rotor to obtain the necessary interference. The shaft is chilled reducing its diameter, while the rotor is heated; then the shaft is inserted into the rotor bore. When the materials return to room temperature (i.e., when there is no longer a thermal gradient), the interference between the rotor bore and shaft is established. However, in HPG 12, the rotor cannot be assembled solely by this method, since once the shrink fit is completed, the rotor cannot readily be separated from the shaft.

In view of these rotor assembly restrictions, the thermal gradient technique is used to fit one rotor half into place while using a hydraulic technique to fit the other rotor half into place. The thermal shrink fit is intended to be permanent, while the hydraulic fit can be disassembled. A drawing of the rotor assembly appears in FIG. 4.

At the design speed of 220 m/s (6,242 rpm), the relative diametral growth between rotor bore and shaft is 0.0060 in. Using a 100 percent factor of safety, the required initial interference is 0.0120 in. This is a conservative design that allows the machine to be run at speeds in excess of the design goals if desired. (At 300 m/s, approximately 3,000 psi interference pressure will still be present between the shaft and rotor bore.)

The 0.012-in. interference produces an interference pressure of approximately 44,000 psi at the contacting surfaces. The maximum combined stress resulting from this pressure occurs at the inner diameter of the rotor and is 78,250 psi. At the design speed of 220 m/s this stress increases to a maximum value of 81,750 psi. This is a clear advantage of the interference fit; the maximum stress remains fairly constant over the operating speed range of the machine. The mechanism for this phenomenon is such that, at zero speed, the stresses present are due entirely to the initial interference between the shaft and rotor bore. As the machine speed increases, the interference is decreased, lowering the stress level due to the interference pressure. Concurrently, the stresses due to centrifugal effects in the rotor increase with speed, keeping the total maximum stress level fairly constant. This effect is particularly advantageous from a fatigue standpoint because the cyclic stresses are minimized.

In order to shrink the right side 20A of the rotor onto shaft 21 a temperature differential large enough to offset the 0.012-in. interference is required. For a 4-in diameter shaft, assuming that 0.001-in. clearance is sufficient for assembly, the required temperature differential between shaft and rotor is 542° F. This differential can be obtained by chilling the shaft, by heating the rotor, or by a combination of both.

To hydraulically assemble the left side of 20B of the rotor, the shaft 21 and rotor surfaces are not separated thermally as in a shrink fit, but by hydraulic pressure supplied by an external pump. The pressure is introduced to the shaft-rotor interface through a port 38 and oil groove 40. High-pressure oil seals 42, 44 on both sides of the oil groove prevent leakage from the ends of the rotor. Once the pressure is applied, the rotor bore expands, the shaft diameter shrinks, and a hydraulic pusher 46 is used to push the rotor half 20B onto the tapered shaft 21. A port 48 and oil groove 50 provided on the shrink-fit side 20A of the rotor enables disassembly of this rotor side if necessary. Since seals are not required for rotor disassembly, they are omitted on the shrink-fit side.

The hydraulic pressure necessary to separate the shaft and rotor bore is the same as the final interference pressure (44,000 psi). A hand-operated pump (Pressure Products Industries Model No. OH-102-60) and high pressure fittings (manufactured by Sno-Trik) may be used; this pumping system is rated at a working pressure of 60,000 psi. In addition, the seals for the system comprise Parker PolyPak Type B seals (material: 90 durometer Molythane P-4615), and Parker Modular Backup rings (material: PolyMyte Z-4652).

The hydraulic pusher 46 is designed to force the rotor onto the shaft while the rotor and shaft surfaces are separated by the high pressure hydraulic system. The inner cylinder of the pusher attaches to the shaft; the outer cylinder, actuated by a low-pressure pump (Southwestern Controls Model No. SC-40-500-3, maximum pressure 5,000 psi), presses against the rotor face and provides the force to push the rotor onto the shaft. At an externally applied pressure of 44,000 psi at the shaft-rotor interface, the force required to push the rotor onto the shaft is 77,500 lb (the shaft and rotor interface has a 1° per side taper). At the present hydraulic pusher dimensions, the low-pressure pump will have to produce 3,800 psi to achieve the 77,500-lb force.

Figure 4:
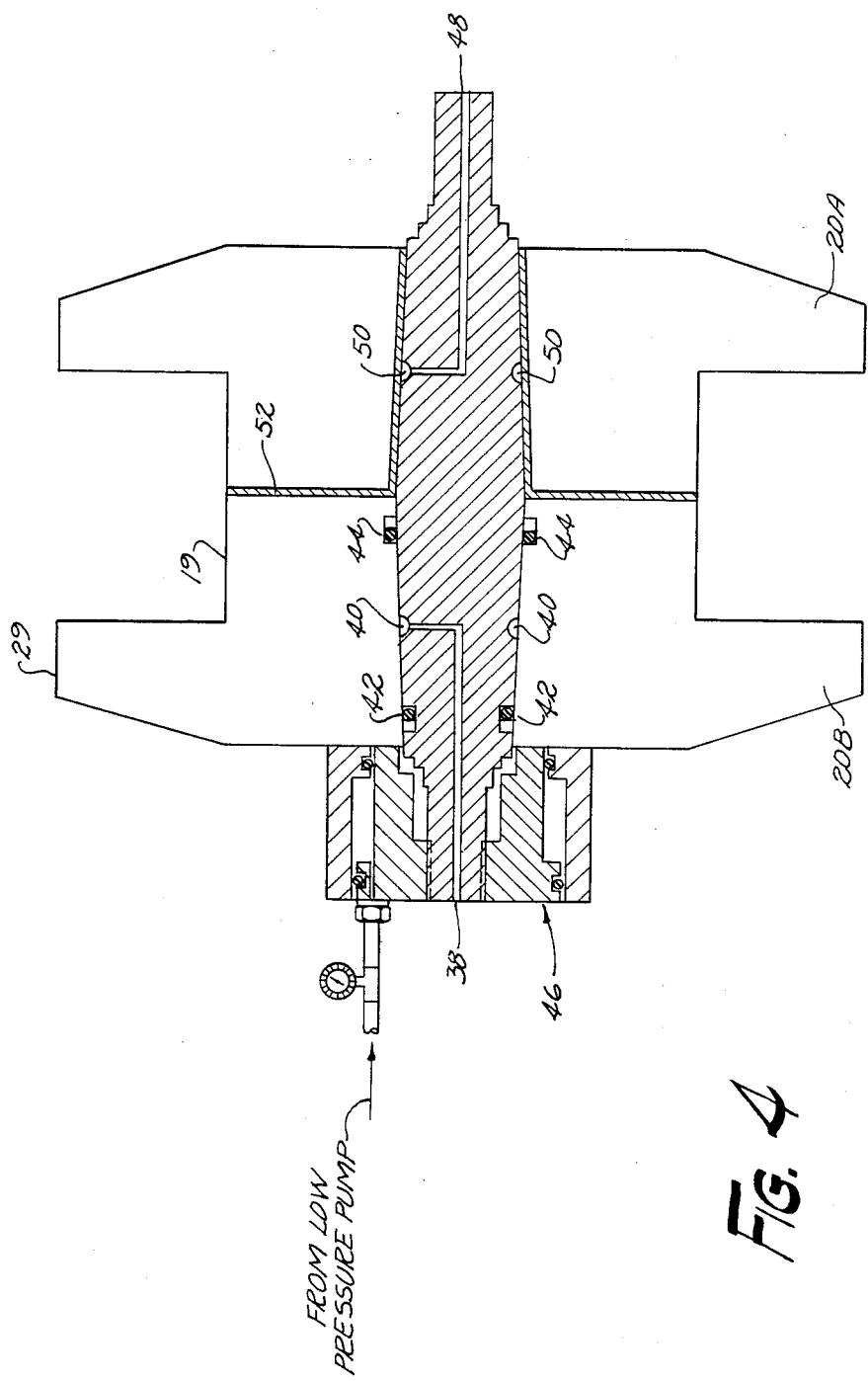
FIG. 4 is a cross-sectional view of the rotor assembly of the HPG power supply, including illustration of rotor hydraulic fitting.

In order to have two voltage generating passes through the machine's externally applied magnetic field, the rotor halves must be insulated from one another. The scheme to accomplish this is illustrated in FIG. 4.

On the shrink-fit rotor half 20A, a ceramic material 52 will insulate between that rotor half and the shaft. In addition, the ceramic will be used to insulate between rotor faces. Because the ceramic will insulate between the shaft and rotor on one side, it will have to withstand some demanding mechanical stresses (it will undergo the full interference pressure) without sacrificing its required electrical properties.

The ceramic coating may be aluminum oxide, such as $Al_2O_3$ available from Norton Industrial Ceramics Division. The coating is preferably applied by a flame-spraying technique such as that conducted by the F. W. Gartner Co., 3805 Lamar, Houston, Tex. After application, the ceramic coating is impregnated with silicon resin, such as General Electric SR182; the resin is allowed to cure and is then ground to dimension.

3. Support Structure and Bearings Systems

Figure 5:
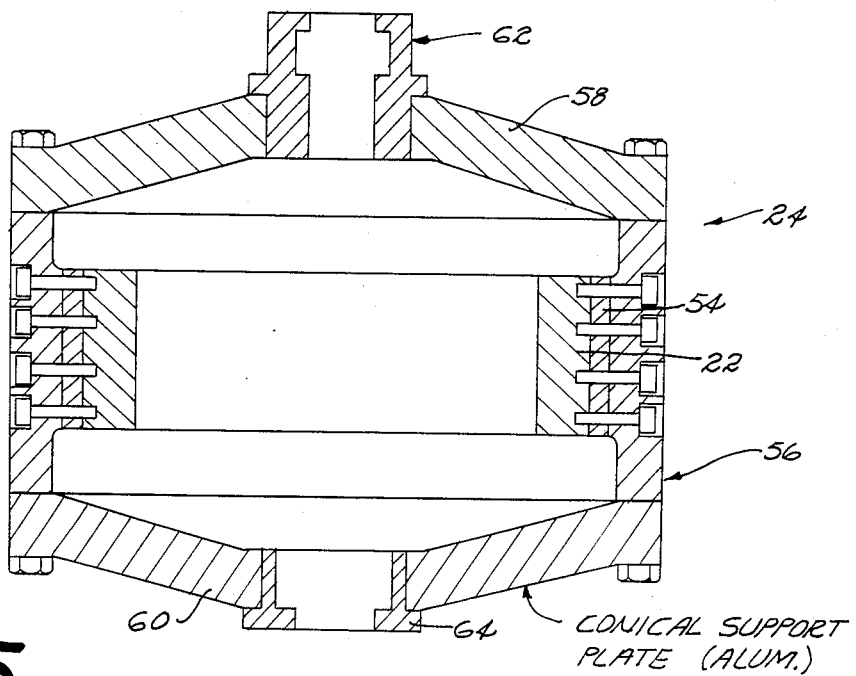
FIG. 5 is a plan view of the support structure for the rotor assembly.
Figure 6:
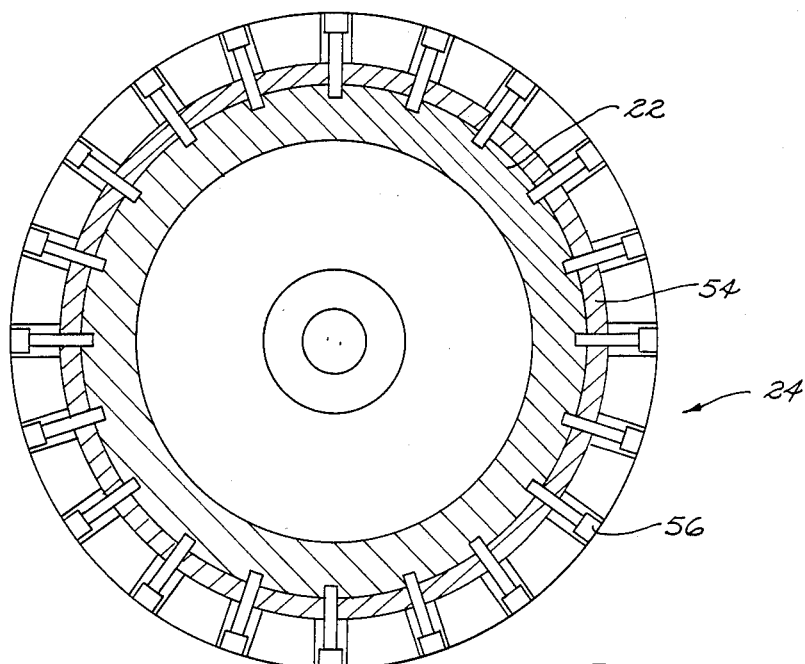
FIG. 6 is a side view of the support structure shown in FIG. 5.

The HPG 12 support structure 24 is shown in detail in FIGS. 5 and 6. The support structure provides alignment and structural integrity needed for the rotor. The support structure also provides a mounting attachment for the stator assembly.

Support structure 24 is made entirely of aluminum and comprises a one-inch thick aluminum ring 54. Preferably, the ring 54 is shrunk fit onto the stator 22. A plurality of T-shaped crossbars 56 are welded to ring 54. Two conical end plates 58, 60 are bolted to the crossbars, and carry stainless steel bearing housings 62, 64.

Figure 7:
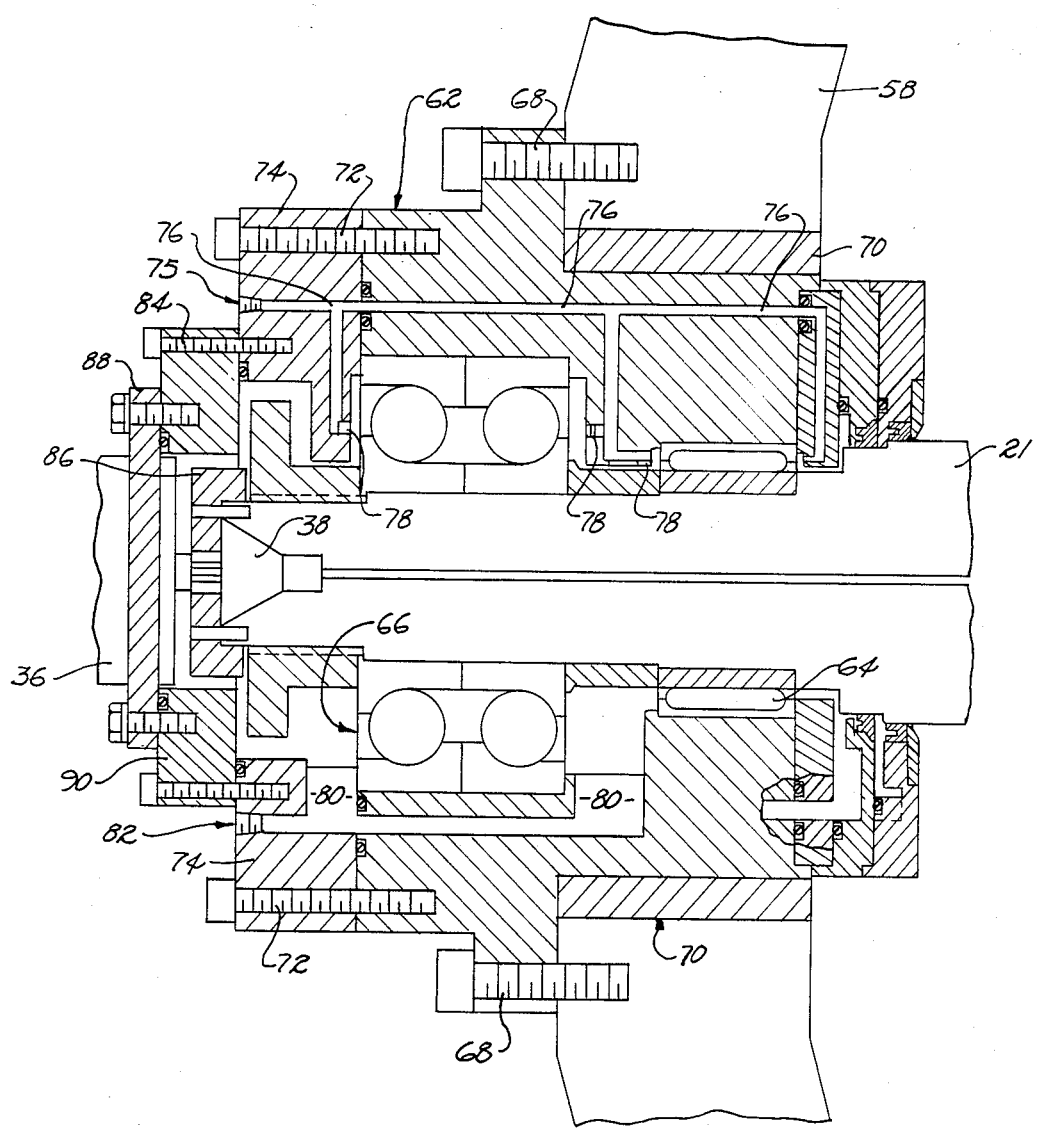
FIG. 7 is a cross-sectional illustration of the thrust bearing assembly shown in FIG. 3.

Bearing system 28 (FIG. 3) is a non-thrust bearing, whereas bearing system 26 in housing 62 is a thrust bearing. Both bearing systems have radial bearings of heavy-duty needle bearings which are suitably Torrington No. HJ-445628 bearings. These bearings include both the inner and outer races and a cage to accurately guide the bearing rollers. In FIG. 7, there is a cross-sectional view of the thrust bearing system 26, showing both the needle roller radial bearing 64 common to the non-thrust bearing system 28 and the duplex angular contact ball thrust bearing 66.

Needle bearings are used because of their inherently high stiffness. Because the rolling elements (the needles) are radially thin and are relatively long axially, they are much stiffer than comparable ball bearings. In addition, the fact that the rollers have line contact with each race (rather than point contact as in ball bearings) also adds to their stiffness. The calculated stiffness for each of the HJ-445628 bearings is $7.23 \times 10^6$ lb/in at a preload provided by the rotor weight.

It is important that the bearings in the HPG 12 machine be preloaded to prevent skidding at high speeds. In the radial bearings this preload is provided by the weight of the rotor (approximately 800 lb per bearing). The radial bearings have a catalog-rated maximum speed of 6,150 rpm; however, overspeeding of rolling element bearings is an acceptable practice provided they receive adequate lubrication and cooling. The radial bearings have a calculated L-10 life of 1,850 hours at continuous operation at 6,300 rpm.

Referring to FIG. 7, the thrust bearing system 26 is shown in position with shaft 21 inserted therein. Additionally, FIG. 7 shows stainless steel bearing housing 62 bolted to conical end 58 of the support structure 24 by bolts 68. Conical end 58 is further shown to include a steel mounting sleeve 70 pressed therein. Connected by bolts 72 is a bearing housing cap 74.

The angular contact ball bearings 66, suitably SKF No. 7411 B, are duplex mounted back-to-back on one end of the machine. Attaining sufficient stiffness from the angular contact ball bearings 66 is accomplished by preloading. To preload these bearings, a shim can be placed between the outer races of the two back-to-back bearings. Then by clamping the two bearings together on the shaft with a nut, the preload can be established. The amount of preload attained can be adjusted by the thickness of the shim between the bearings. The tradeoff to be made for the thrust bearing is stiffness versus life. Increasing the preload increases the stiffness while decreasing the bearing life. At an 8,000-lb preload ($8.5 \times 10^6$ lb/in stiffness), the calculated L-10 life of the thrust bearing pair is 97 hrs. The rated speed limit of the bearing is approximately 5,100 rpm; however, overspeeding is acceptable when adequate lubrication and cooling are provided.

Lubrication and cooling is provided by an injection of oil into the bearing rolling elements. Oil flow is provided through lubrication oil inlet 75 to oil injection passages 76 in bearing housing 62 and housing cap 74. At the end of each passage is a nozzle 78, which may suitably be a 0.055-in-diameter fluid restrictor (Lee Plug Jet Part No. 187002-005). As shown, there are two oil jets provided for each side of each set of bearing roller elements so that the bearings will receive lubricant in case of a clogged restrictor. Also in bearing housing 62 and housing cap 74 are oil sump passages 80 leading to a lubrication oil sump outlet 82. Preferably, the lubrication oil will be passed through at a total flow rate of 10 gal/min. Oil scavenging is at 25 gal/min to prevent oil from pooling in the bearing housing and keep viscous friction losses to a minimum.

There is further shown in FIG. 7 a clamping nut 84 on the end of shaft 21 and a drive coupling 86. Driving motor 36 (FIG. 3) is partially shown coupled through mounting flange 88 and spacer 90 to housing caps 74 and drive coupling 86.

4. Stator Assembly

Figure 8:
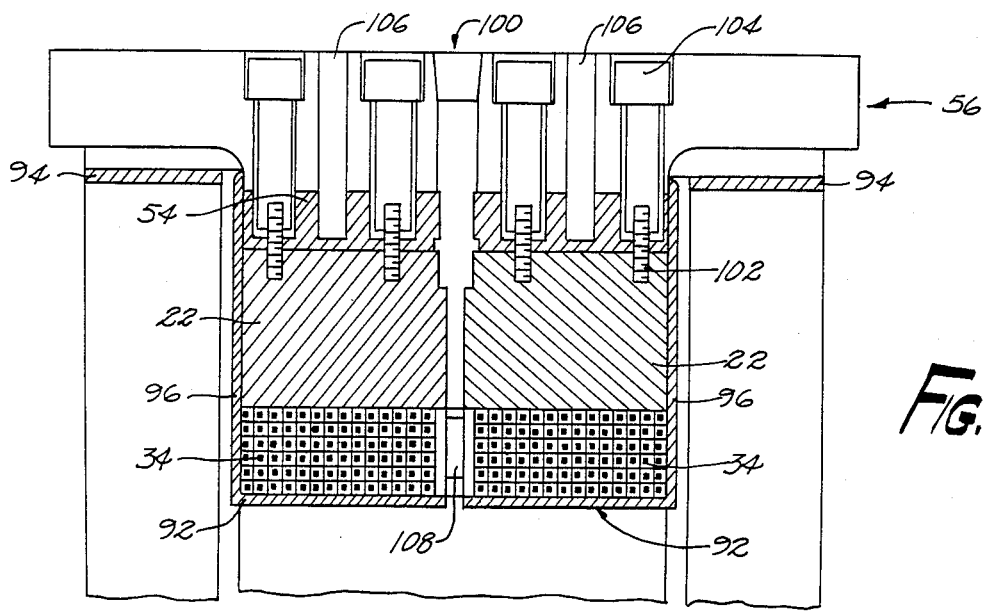
FIG. 8 is a cross-sectional view of the stator assembly of the HPG power supply.

The stator assembly for HPG 12 is shown in detail in FIG. 8. The stator assembly may be regarded as including the ferromagnetic stator ring 22, the field coil 34, and the aluminum T-bars 56 (FIG. 5) for connecting the ferromagnetic stator rings to the support structure. Additionally, the stator assembly includes inner brush ring 92 and outer brush ring 94. Connecting to the inner brush ring are current collecting conductors 96A and 96B.

The ferromagnetic stator 22, preferably of A-36 steel, conducts the magnetic field from one rotor face to the other. Since the inner brush mechanisms are air-actuated, as will be described, an air manifold 98 is provided through stator ring 22 and in communication with brush air inlet 100. As noted in the description relating to the support structure 24 shown in FIGS. 5 and 6, aluminum ring is shrunk onto stator ring 22. Additionally, the aluminum ring is pinned to the stator by steel studs 102. As shown in FIG. 8, the T-bars 56 are bolted by stainless steel bolts 104 to the aluminum ring. The bolts 104 are modified so as to register with and have inserted in the ends thereof the steel studs 102. To further enhance the connection of the T-bar 56 to aluminum ring 54, dowel pins 106 are inserted through the T-bar and into ring 54. Bolts 104 are preferably ½ inch in diameter, and dowel pins 106 are preferably ⅜ inch in diameter. It is also preferred that compensating conductor 96 be held firmly to the steel stator ring by, for example, nylon flathead screws (not shown).

Field coil 34 comprises two coil halves 34A and 34B, preferably designed for 70,000 amp-turns and a magnetic air gap of 0.5 inch. Because of its interior location, field coil 34 must be as thin as possible radially. Accordingly, the coil is pulsed rather than steady state. Each field coil half has 156 turns of 0.23 inch square solid copper conductors insulated with a heavy coat of armored polythermalized insulation.

The terminals 108 of the coil are plug-in-Multilam connectors located between the two coil halves 34A and 34B. Terminal access is through the center of the stator which minimizes field dissymmetry. The coils can be run either in series or in parallel and require a 30-V, 417-amp power supply per coil at the 70,000 amp-turn level. In parallel the 30-V requirement is very nearly compatible with an Army 28-V generator.

The field coil is fabricated as follows. The square conductors are half-lap-wrapped with 0.005-inch thick, ½ inch wide fiberglass tape. Then the two conductors are wound separately onto the two halves of a vacuum impregnation mold. The terminals are then brazed into place, the two halves are bolted together, and the entire structure is vacuum impregnated with a low viscosity, 250° F., elevated-temperature-cure epoxy.

5. Brush Mechanisms

Figure 9:
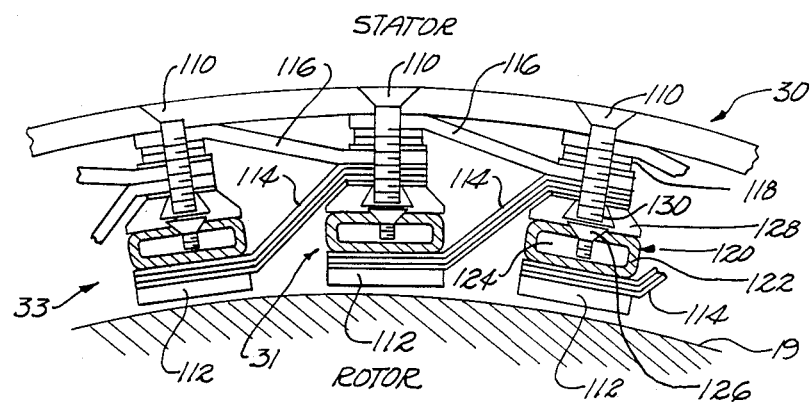
FIG. 9 is a sectioned end view of three of the inner brush mechanisms used in the HPG power supply.
Figure 10:
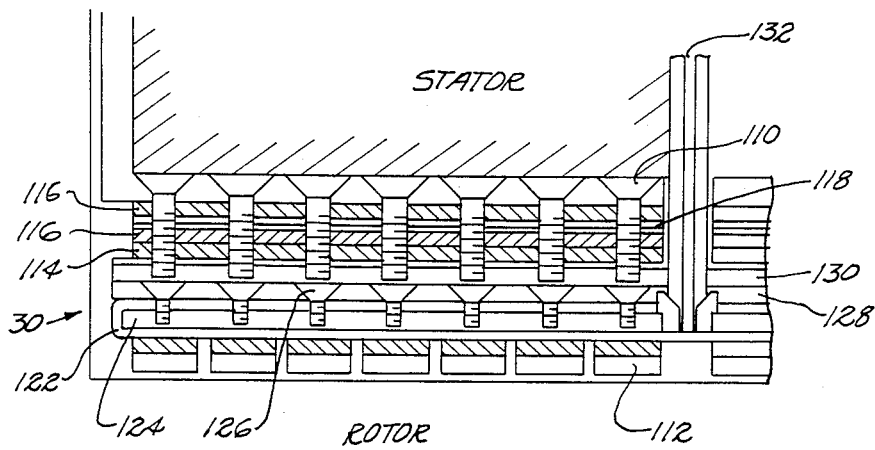
FIG. 10 is a sectioned side view of one of the inner brush mechanisms in the HPG power supply.
Figure 11:
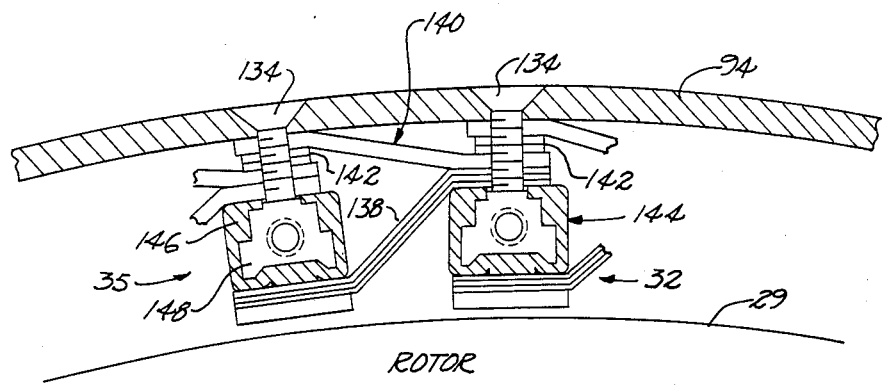
FIG. 11 is a sectioned end view of two of the outer brush mechanisms used in the HPG power supply.
Figure 12:
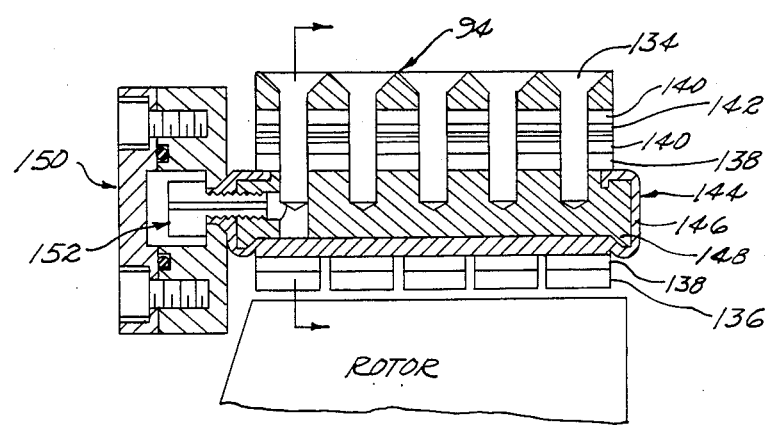
FIG. 12 is a sectioned side view of one of the outer brush mechanisms used in the HPG power supply.

Collection and transfer of current from the high-surface-speed slip rings is accomplished in HPG 12 by the inner brush mechanism shown in FIGS. 9 and 10 and the outer brush mechanisms shown in FIGS. 11 and 12. This is a demanding task, and because of the A-I-R configuration of the machine, additional constraints are placed on the inner brush mechanism in regard to radial height. That is, the radial height must be minimized because the brush and its actuator directly reduce the flux-cutting area of the rotor, which in turn reduces the generated machine voltage. In HPG 12, the outer brush mechanism is also subject to additional considerations since it is being used as the current making switch.

Referring first to FIGS. 9 and 10, the inner brush mechanism 30 is shown in position relative to the stator and the rotor. In FIG. 9, the brush mechanism is shown in an end view (along with two other brush mechanisms 31 and 33). In FIG. 10, brush mechanism 30 is shown in a side view.

The inner brush mechanisms are shown in FIGS. 9 and 10 connected to the inner brush current collecting conductor ring 92 by flathead screws 110. The brush pads 112, which make contact to the rotor inner slip ring surface 19, are preferably ⅛ inch thick by ¾ inch long by 7/16 inch wide sintered copper-graphite blocks. Each brush pad is attached by silver brazing to a brush strap 114 that carries the current to the brush ring.

The brush straps must conduct extremely high currents without becoming excessively hot. They must operate in a relatively high magnetic field and thus are subjected to high electromagnetic forces during a current pulse. The strap must provide sufficient elastic spring force to lift the brush clear of the slip ring. Finally, and most important, the strap must provide a dynamically stable brush mount sufficiently soft radially to allow the brush to track the slip ring but sufficiently stiff axially and circumferentially to ensure that the brush returns to exactly the same orientation on the rotor after each actuation.

As brush 112 wears away with use, it is desirable to compensate for this wear so that the brush is retracted the same distance from the rotor slip ring surface throughout its useful lifetime, ensuring consistent brush actuation times and down forces. Unfortunately for compact, high packing factor brush assemblies that require short brush straps, the bending stress in the solid copper strap is exceeded during brush actuation, causing the brush strap to yield in the "brush down" position and resulting in a loss of ability to retract the brush. Conventionally hardened copper (hardened by cold working or rolling) cannot be used to raise the yield strength of the brush strap since it will be annealed during the process of brazing the brush strap to the brush.

As a solution, brush straps 114 are laminated. A laminated brush strap is both dynamically stable and stiff in the axial and circumferential planes. This means that the brush will swing through the same arc and make contact in the same location with each actuation. This is important because as the brush wears it makes better contact, but it must make contact in the same orientation with the slip ring during each cycle. The brush strap must be radially soft because whatever mechanism is actuating the brush must overcome the strap stiffness as well as provide adequate down force of the brush onto the slip ring. However, the strap must be thick enough to conduct the current without an excessive temperature rise. Also, it must be strong enough to lift the brush clear of the slip ring; thus it should not yield during actuation. These problems were resolved by laminating the brush strap. By making the laminations different thicknesses and out of different types of copper (i.e., beryllium, ETP 110, or dispersion strengthened copper, which is not annealed during brazing), various combinations of stiffness, cross-sectional area and strength can be obtained. A typical example is a strap made of two 0.031-inch-thick ETP 110 copper straps and one 0.031-inch-thick dispersion strengthened copper strap—all 7/16 of an inch wide.

Laminated brush straps 114 will each conduct 3,000 amperes for 0.25 seconds with a 15° F. temperature rise. It takes approximately 5 pounds to move the brush 1/16 of an inch, which provides a lift force of approximately 4.5 pounds. Each strap 114 is approximately one inch long.

The discharge currents in the brush straps 114 react with each other and with the excitation magnetic field to lift the brushes off the slip ring during a discharge. Therefore, current compensating straps 116 are provided to counteract these effects. Straps 116 increase the brush down force as the current magnitude increases because the currents flowing in opposite directions repel each other. This guarantees maximum down force at peak current. Spacers 118 are also shown on screws 110 between adjacent compensating straps.

Brush pads 112 are downwardly actuated to contact with the slip-ring of the rotor, and a down force is applied to maintain brush contact. Actuation of each brush 112 is by a brush actuator 120. The actuator comprises an inflatable diaphragm that forces the brush down. As indicated, one actuator provides simultaneously a down force to a row of brushes (FIG. 10). The diaphragm 122 is suitably synthetic rubber (neoprene) molded around a metal (brass) core 124, and bonded by a vulcanizing process to the top and sides thereof but not to the bottom.

The diaphragm 122 is secured by flathead screws 126 to a fiberglass dovetail mount 128. The mount engages a mating mount 130 carried on the end of screws 110.

Pressurized gas at about 90 psi is introduced through a hole in the metal core and into the diaphragm cavity. This expands the diaphragm against the back of strap 114 and forces brush pad 112 into contact with the rotor slip ring. The pressurized gas is introduced via inlet tube 132.

Referring now to FIGS. 11 and 12, outer brush mechanism 32 and adjacent brush mechanism 35 are shown connected by screws 134 to conductor ring 94 and in position adjacent rotor outer slip ring surface 29. Each brush mechanism comprises a brush pad 136 for making contact with the rotor slip ring surface. The brush pads are preferably sintered copper-graphite blocks having dimensions of $\frac{3}{8}$ inch in thickness by $\frac{3}{4}$ inch in length by 7/16 inch in width. Each brush pad is attached by silver brazing to a laminated brush strap 138. Brush straps 138 are a composite lamination of two 1/32 inch thick annealed copper straps and one 1/32 inch thick dispersion strengthened copper strap.

To prevent discharge currents in brush straps 138 from reacting with each other and with the excitation magnetic field, current compensating straps 140 are provided. Straps 140 extend between adjacent screws 134, and spacers 142 are placed between the straps on each screw.

Deflection of brush straps 138 to place brush pads 136 in contact with the slip ring surface 29 is by actuator devices 144 carried on the ends of screws 134. The actuator devices comprise a neoprene diaphragm 146 that inflates when pressurized, forcing the brush pads down. As shown in FIG. 12, each actuator provides a down force simultaneously to a row of brush pads 136. The diaphragm 146 is molded around a metal (brass) core 148. The metal core is further connected to a manifold 150 having an air inlet 152 therein. Pressurized gas (air) at 90 psi is suitable for actuating brush actuator devices 144. Actuation time is on the order of about three milliseconds. The down force applied is about 4½ to 5 lbs.

Figure 13:
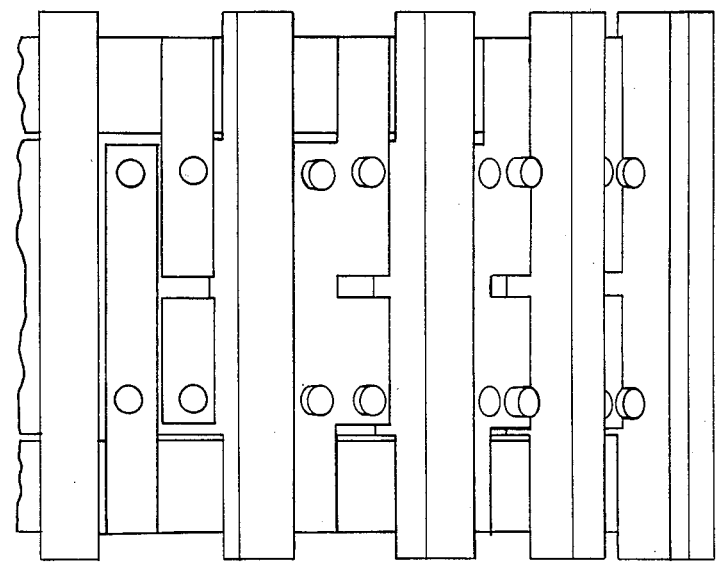
FIG. 13 is an illustration of the conductor crossovers for electrically connecting the two rotor halves in series.

To electrically connect the two rotor halves in series, which effectively doubles the HPG open-circuit voltage, conductor cross-over structure is required. Referring to FIG. 13, there is shown a portion of the exterior of HPG 12. In view are cross-over bars 154, along with arrows indicating discharge current. Each cross-over bar arrangement comprises two copper bars, $\frac{5}{8}$ inch thick by 1$\frac{3}{8}$ inch wide. The bars 154 are nested between the aluminum T-bars 56. The bars 154 are attached to conductors 94 and 96 (FIG. 8) by silver brazing. Terminals 156 are also shown in FIG. 13.

D. Auxiliary Supply and Drive System

Figure 15:
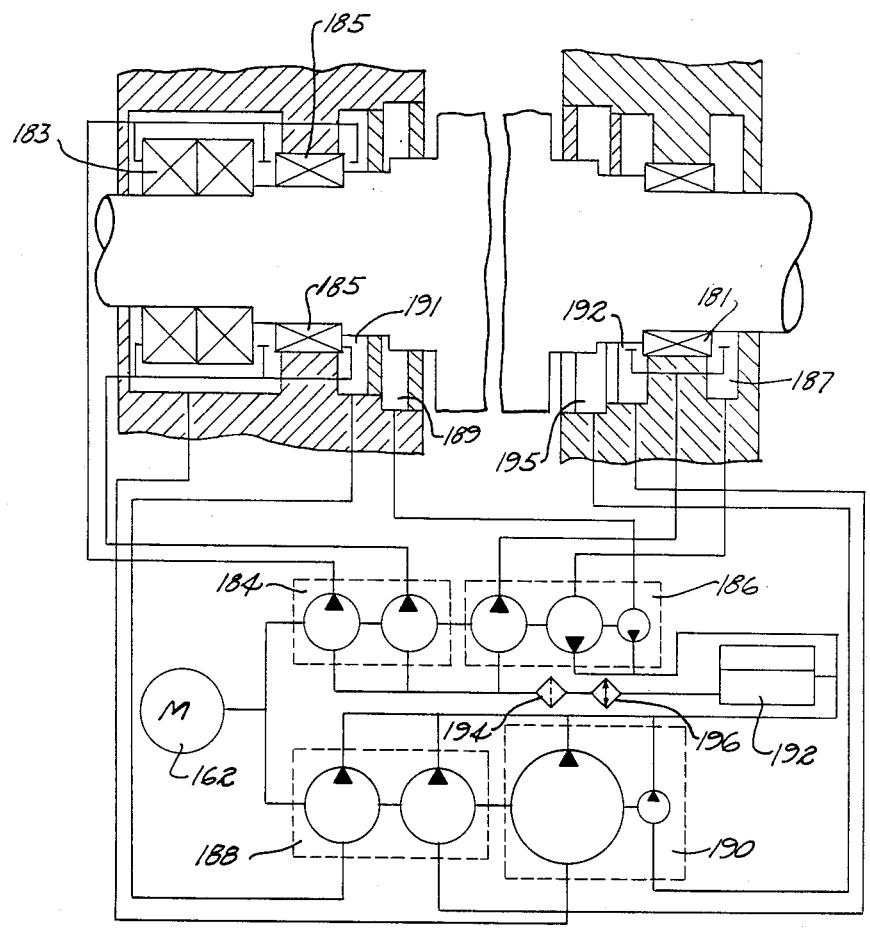
FIG. 15 is a schematic diagram of the bearing lubrication system.
Figure 16:
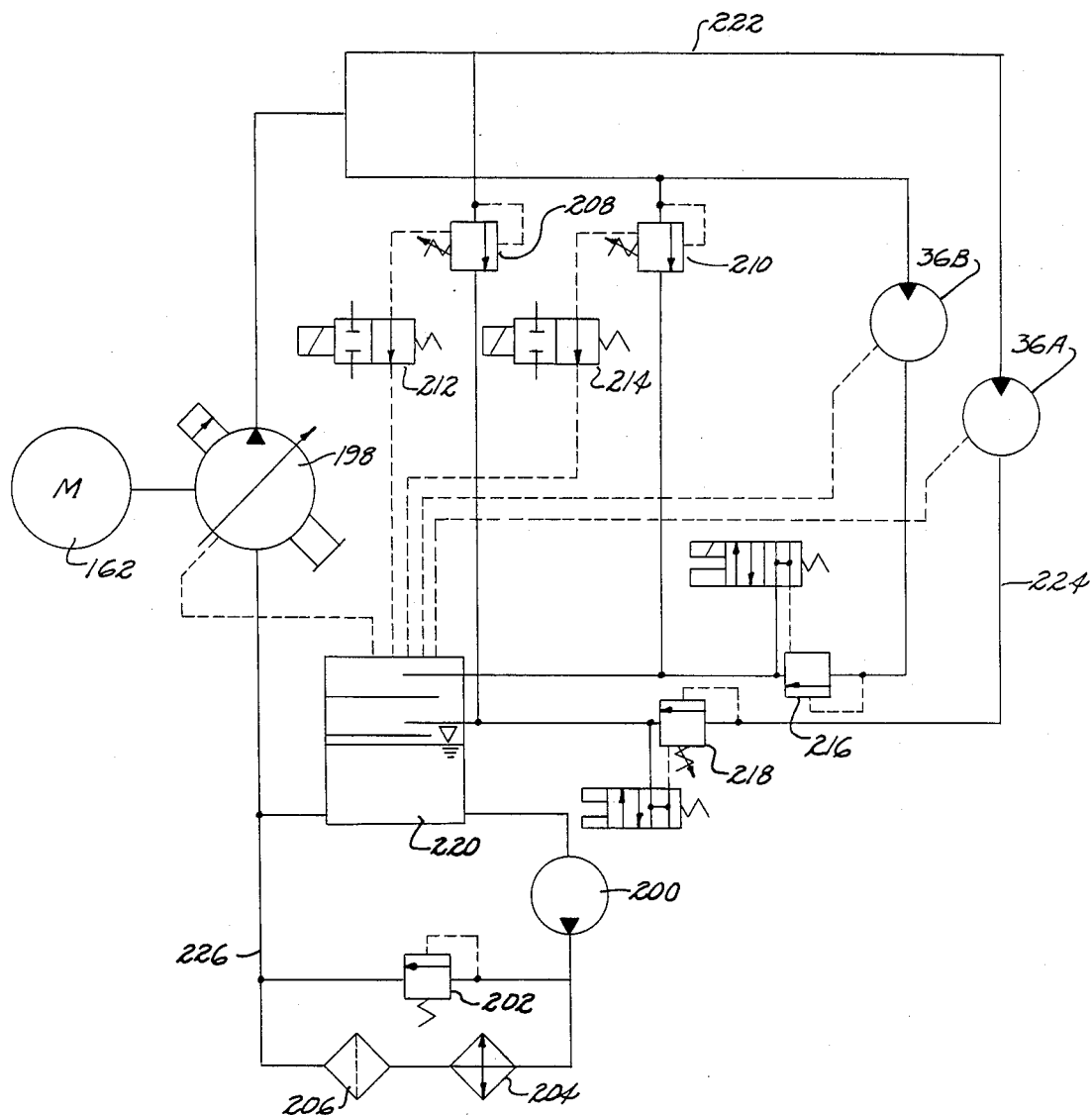
FIG. 16 is a schematic diagram of the motoring system for bringing the HPG to speed.
Figure 17:
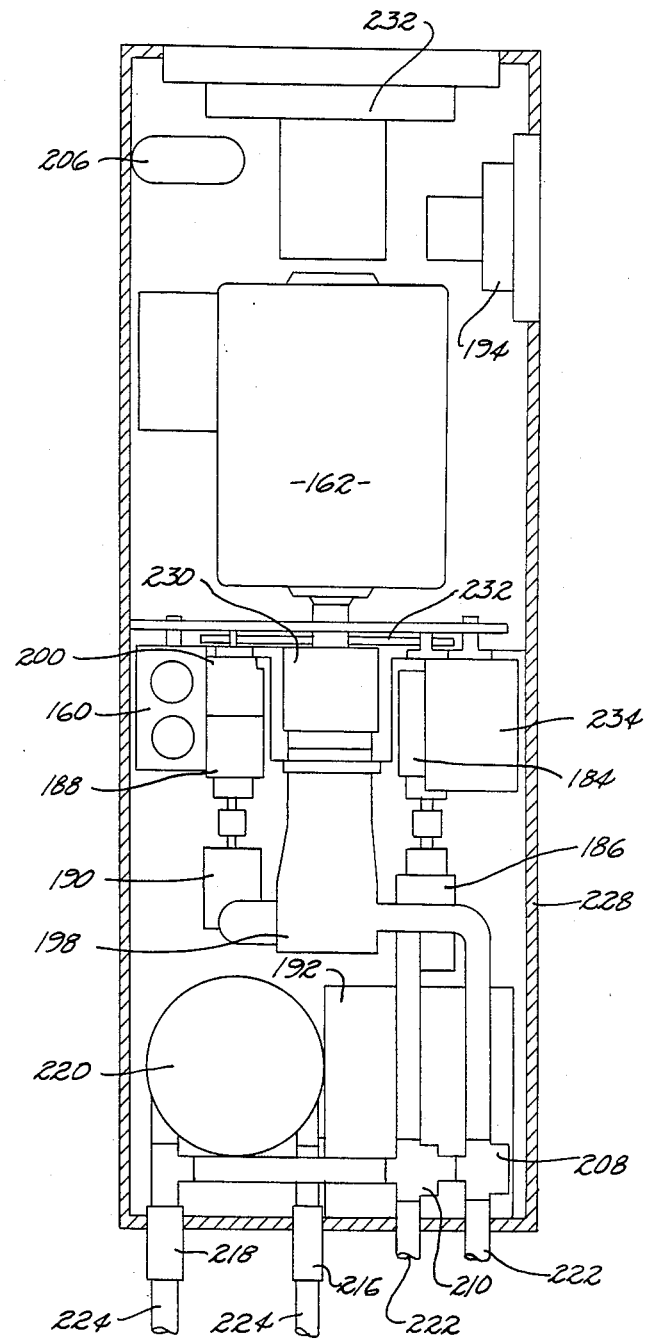
FIG. 17 is an illustration of the auxiliary and drive package for the HPG.

The auxiliary supply and drive system includes the brush actuator air supply (FIG. 14), the bearing lubrication system (FIG. 15), and the motoring system (FIG. 16). These subsystems are shown in FIG. 17 in an arrangement on a skid mount. All subsystems are powered by a prime mover, e.g., any motor, engine, or turbine, capable of 200 hp at 1800 rpm. Suitably, a squirrel-cage induction motor such as a Lineguard 445T is used. It is a dripproof motor with a service factor of 1.15 and varnished windings requiring one 460 v three-phase line. Its full-load speed is 1,780 rpm, and its full-load torque is 600 ft/lbs.

1. Brush Air Supply

Brushes 30, 32 (FIG. 3) for HPG 12 are actuated by compressed air. The pneumatic control circuit shown in FIG. 14 will supply the brush actuators with 90 psi compressed air. The air volume of the inner brush mechanism 30 is approximately 100 in$^3$, roughly ½ gal. The volume of the outer brush mechanism 32 is approximately 190 in$^3$, roughly one gal. The total system is sized to handle up to 150 psi, although normal operation is anticipated in the vicinity of 90 psi.

Figure 14:
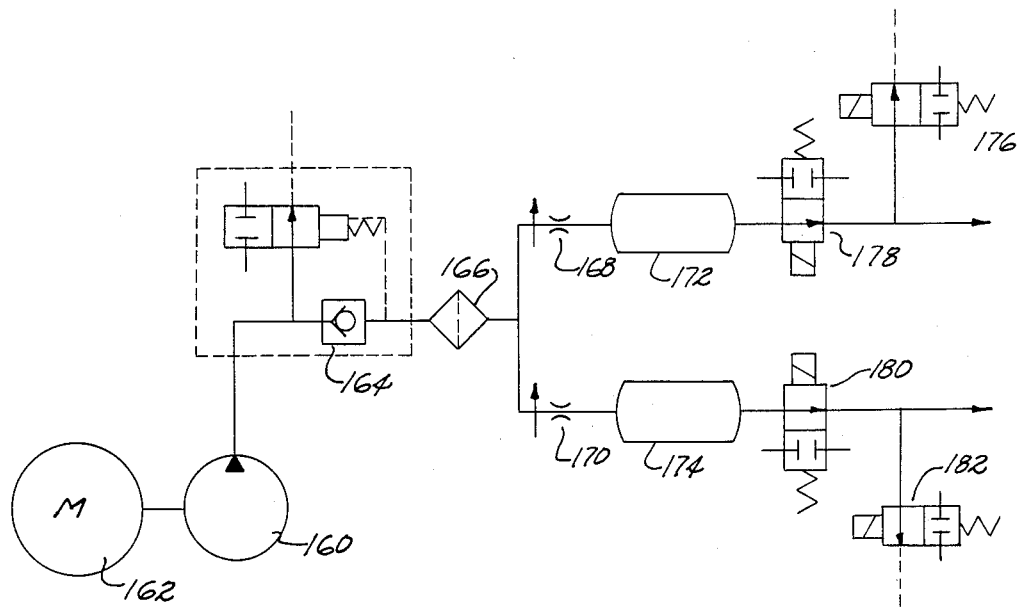
FIG. 14 is a schematic diagram of the air supply for the pneumatic brush mechanisms shown in FIGS. 9–12.

A single-stage, two-cylinder air compressor pump 160 in FIG. 14 is belt-driven from the prime mover 162. The compressor 160 (Speedaire 2Z499) is rated to 150 psi maximum pressure and delivers 5.70 cfm free air at 100 psi and 735 rpm. At 100 psi this corresponds to 6.25 gal/min compressed air. This means the accumulators 172, 174 can be charged to 100 psi in under one minute. The compressor requires up to 2 hp when not unloaded.

Once the accumulators have been charged the compressor will be unloaded (outlet vented to atmosphere) by a continuous run unloader control 164. The unloader Control Devices 95X709 is rated to 250 psi maximum pressure at 20 cfm. Control pressures are adjustable to 135 psi. The unloader also acts as a check valve. Downline from the unloader is a 250 psi air filter 166 to prevent compressor oil from entering the brush mechanisms. The air filter Speedaire 2Z328 is rated at 110 cfm with 40-micron filtration. After filtration, two 125 psi pressure regulators 168, 170 provide control of accumulator pressure. The regulator Speedaire 1Z838 is rated at 250 psi maximum pressure at 18 cfm. Compressed air is stored in two 3-gal accumulators 172, 174. Brush air pressure control is accomplished with four 300 psi normally closed, two-way solenoid valves 176, 178, 180, 182. These valves have a 1-in port, assuring quick pressurization and venting. The valves are Atkomatic 15430-M semidirect lift solenoid equipped with manual opening handwheels.

2. Bearing Lubrication System

The rolling element bearings 26, 28 (FIG. 3) used in the HPG 12 require oil jets for proper lubrication and cooling. Sufficient scavenging capacity is required to prevent accumulation of lubricant in the bearings and sump cavities.

The lubricant preferred is a parafinic mineral-based oil with a foam suppressant having a viscosity of 100 SSU at 150° F. This lubricant will carry away a significant portion of bearing and seal drag heat output. Bearing losses are estimated at 7.7 hp total; seal losses are estimated at 7.2 hp total. These losses are nearly linearly dependent on speed and represent worst-case figures.

A schematic of the bearing lubrication system is shown in FIG. 15. The supply and scavenge pumps are belt-driven by the prime mover 162. The bearing oil supply pressure is provided by three 3.2-gpm Gerotor pumps. A Double A H3H3 Gerotor double pump 184 supplies pressure to the thrust duplex pair 183 and the thrust end radial bearings 185. Redundant circuits assure lubricant flow to both bearings in case of failure of either pump. The oil pressure for the non-thrust-end radial bearing 181 is provided by one 3.2-gpm pump of a Double A H3H3D1 Gerotor triple pump 186. This pump is driven by a through shaft from pump 184 through a flexible coupling. The other 3.2-gpm pump is used to scavenge the outer non-thrust-end sump 187. The small 1-gpm pump is used to scavenge the inner thrust-end sump 189.

The third pump 188 is belt-driven by the prime mover. The Double A H5H5 Gerotor double pump scavenges both middle sumps 191, 192 with a capacity of 5.0 gpm each. Driven from the third pump through a flexible coupling, the fourth pump 190 is a Double A H12D1 Gerotor double pump. The 13-gpm pump scavenges the outer thrust-end sump 193. The 1-gpm pump scavenges the non-thrust-end inner sump 195.

Overall supply flow is 9.6 gpm while overall scavenge flow is 28.2 gpm. This results in a scavenge-to-supply ratio of 2.9.

Flow from the scavenge pumps is directed to a 10-gal reservoir 192 for defoaming. From the reservoir, oil is pulled through an oil cooler 194 and filter 196 by the supply pumps. The Perfex SB 2H oil cooler is rated at 20 hp/100° ITD at 9.6 gpm. The cooler has minimal pressure drop at this low flow. The Hycon DFFY 330 oil filter is rated for 46 gpm at 3,000 psi and provides 5-micron filtration. Should the pressure drop of these components cause cavitation in the supply pumps, they can be moved to the scavenge to reservoir line. This location would be undesirable as cooling capacity will drop due to air entrapment in the oil cooler. However, the system should be able to maintain the machine at speed indefinitely.

3. Motoring System

Two hydraulic motors 36A, 36B (FIG. 3), one on each end of the shaft, will be used to bring the A-I-R HPG 12 to speed. Volvo F11D-19 hydraulic motors are preferred to obtain a motoring time of approximately 2 min to reach 6,300 rpm, the design speed. The hydraulic circuit, shown schematically in FIG. 16, must supply each hydraulic motor with 32 gal of 5,000 psi hydraulic fluid per min. In the schematic, new ANSI fluid power symbols are used to identify the components.

The hydraulic motors 36A, 36B in FIG. 16, have a 1.16 in$^3$/rev displacement, a maximum continuous operating pressure of 5,000 psi, and a listed maximum operating speed of 7,500 rpm. They have a constant output torque of 922 in-lbs each and require 31.6 gal/min each at 6,300 rpm before mechanical and volumetric efficiencies are included. Estimated mechanical efficiency is 90 percent and estimated volumetric efficiency is 99 percent.

The hydraulic supply pump 198 is a Hydromatik A7V 164 DR variable displacement, flange-mounted, bent axis, axial piston pump. It has a displacement of 164 cm$^3$/rev, maximum speed of 2,000 rpm, adjustable constant pressure control, and mechanical stroke limiter. It has a theoretical output of 77.1 gpm at 1,780 rpm, which becomes 74.8 gpm with 3 percent displacement losses. Thus the hydraulic circuit has a 15 percent margin of safety including manufacturers losses, for motoring to 6,300 rpm.

A separate cooling and filtering circuit will cool the hydraulic fluid during motoring and idling. The cooling pump 200 is a 40 gpm flange-mounted gear pump. The Hydreco 2025 fixed displacement pump is rated for 1,800 rpm and 750 psi although system pressure is limited at 100 psi by an in-line relief valve 202. This relief valve protects the oil cooler 204 and filter 206 from over pressures during start-up. The Circle Seal 5159B in-line relief valve 202 is rated for 40 gpm and 1,200 psi maximum. The cracking pressure is adjustable from 85 psi to 120 psi. The Perfex SB-6H oil cooler 204 was sized to dissipate the heat generated from the hydraulic braking valves at 75 hp/100° F. (indicated temperature difference). It has an estimated pressure drop of 40 psi, a maximum operating pressure of 150 psi, and a maximum flow of 72 gpm. The Gresen F401 filter 206 provides 10-micron filtration. The filter is rated for 75 gpm at 200 psi and has a 15 psi bypass spring.

After motoring to speed the pilot-operated relief valves 208, 210 will be opened to the reservoir by two-way solenoid valves 212, 214. This will allow freewheeling of the hydraulic motors and will bypass the main supply pump output to the reservoir during discharge or idling conditions. The Victor Fluid Power VR323105 pilot-operated relief valves 208, 210 operate as a 6,000 psi relief valve until vented by the two-way solenoid valve. The valve is rated at 10,000 psi maximum pressure at 50 gpm flow. The Circle Seal SV460 two-way solenoid valves 212, 214 are rated at 6,000 psi maximum pressure. They have a $C_v$ of 0.64 which assures very low vent pressure. These valves are normally open so that in the event of loss of power the relief valves will fail open.

The hydraulic braking valves 216, 218 are 2,500 psi pilot-operated relief valves vented by normally open solenoid valves similar to the freewheel relief valves. The Vickers CT5-10 solenoid-controlled relief valve combines both in one unit. These valves were selected for their low vented pressure drop of 25 psi at 35 gpm. A higher pressure drop would adversely affect the hydraulic motors. These valves will be open except during emergency shutdown situations. When closed, these braking valves will stop the rotor in less than 3 min from 6,300 rpm.

The hydraulic fluid reservoir 220 has two defoaming plates and a capacity of 10 gal. It will be constructed from welded aluminum pipe and sheet stock. The high-pressure feed hose 222 will be 1.00-in ID, 1.91-in OD, 6-spiral-wire, double-armored hydraulic hose. It is rated at 5,000 psi working pressure and 20,000 psi minimum burst pressure. The return hose 224 will be 1.25-in-ID, 1.91-in OD, 4-spiral-wire, double-armored hydraulic hose. It is rated at 3,000 psi working pressure and 12,000 psi minimum burst pressure. The cooling circuit hose 226 will be 1.38-in ID, 1.75-in OD, single-wire braid hydraulic hose. It is rated at 500 psi working pressure and 2,000 psi minimum burst pressure. The hydraulic medium chosen for the system is Rando Oil HD32. It is a high-grade mineral-based hydraulic fluid with a viscosity of 152 SSU at 150° F., the projected operating temperature.

4. Auxiliary System Mounting Arrangement

Referring now to FIG. 17, the mounting arrangement of the supply subsystems on a skid frame 228 is diagrammed. The prime mover 162 is securely located between the rails of frame 228. To one end of the prime mover is hydraulic supply pump 198. A flexible coupling 230 is shown interconnecting the prime mover and pump 198. Drive belts 232 connect the prime mover to bearing oil supply double pump 184 and bearing oil scavenge double pump 188. Bearing oil supply pump 186 is driven by pump 184. Similarly, bearing oil scavenge pump 190 is driven by pump 188. Reservoir 192 which receives flow from the scavenge pumps is shown in the forward part of the skid frame. The oil from the reservoir is pulled through cooler 194 located aft of prime mover 162.

Hydraulic cooling circuit pump 200 is mounted on the skid adjacent pump 188 and driven by prime mover. The hydraulic oil filter 206 is mounted aft in the skid frame. The hydraulic relief valves 208, 210 are shown in position in the forward portion of the skid frame, along with braking valves 216, 218. Hydraulic fluid reservoir 220 is mounted just behind valves 216, 218 and adjacent the oil reservoir. The high pressure hydraulic feed hoses 222 are carried in the forward end of the skid frame as are the hydraulic return hoses 224. A hydraulic air cooler 232 for prime mover 162 is mounted to the aft end of the skid.

Also mounted on the skid is field coil generator 234. This generator, belt-driven from prime mover 162, energizes the HPG field coils. The air compressor 160 for the brush actuator system is mounted on the opposite side of the skid from generator 234, and is also belt-driven from the prime mover. HPG 12, though not shown, is also mounted on the skid frame.

E. Control System

Figure 18:
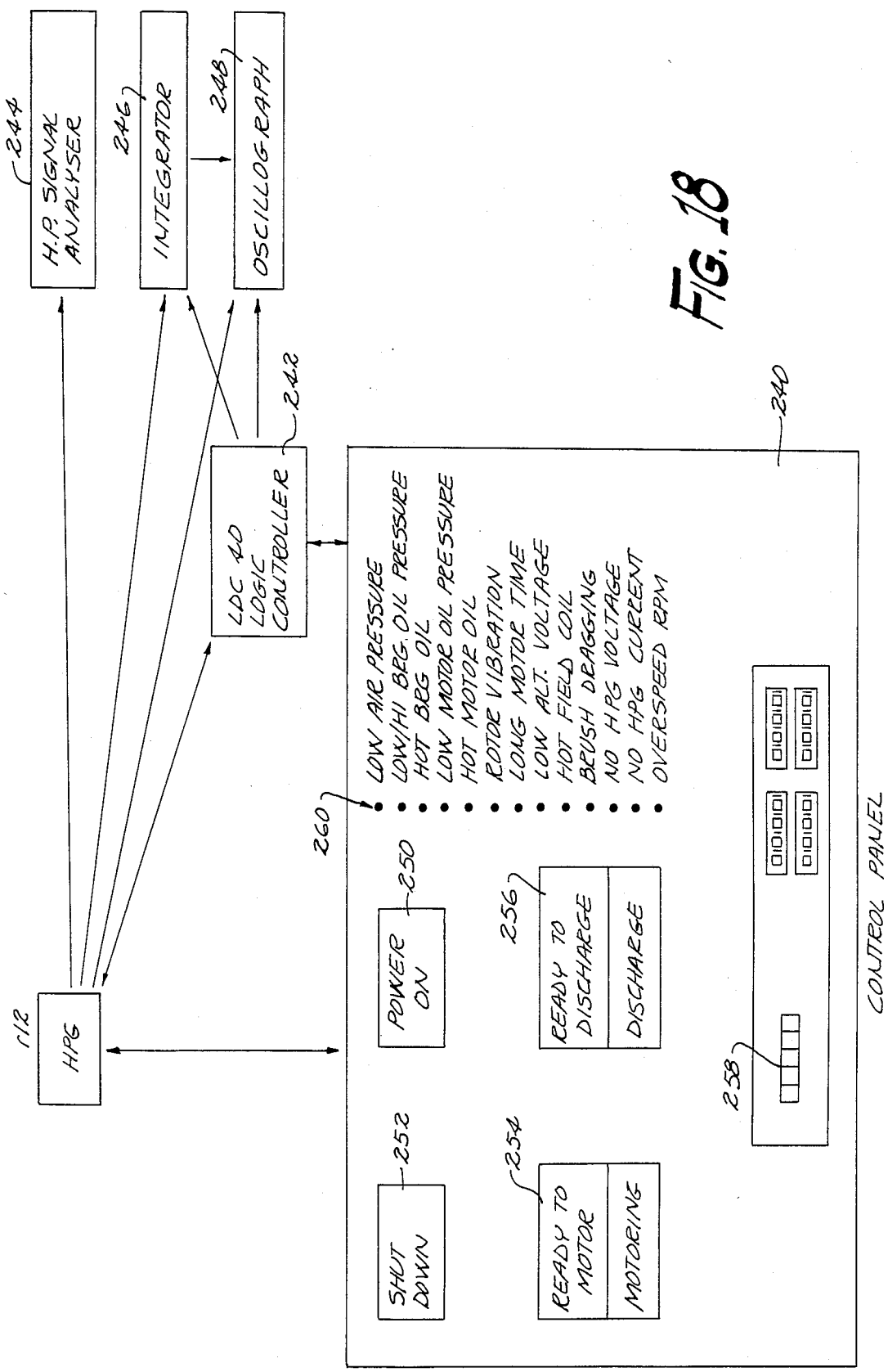
FIG. 18 is a diagram of the control system.

The control system 18 (FIG. 1) functions to control the various systems of the HPG power supply, and to disarm the machine if a fault occurs. The HPG power supply is controlled by an operator through a control panel 240 shown in FIG. 18. The control system further includes a logic controller 242, an LDC-40 device, interconnected with the control panel and HPG 12. Instrumentation, including a signal analyzer 244, an integrator 246, and an oscillograph 248 are also provided and receive control signal inputs from the logic controller. The instrumentation provides information useful to monitor machine performance. For example, the following may be monitored: discharge current, rpm, voltage, rotor runout, and bearing signature analysis.

The control panel 240 with which the operator interfaces has four push buttons for controlling HPG 12 including power on button 250, shut down button 252, ready to motor button 254, and ready to discharge button 256. A digital tachometer 258 is provided, and there are a series of fault-indicating lights 260. The fault lights indicate the following:

Low Brush Pressure—two pressure switches with a low point set at 90 psi.

Low/Hi Bearing Oil Pressure—one pressure switch set at a low point of 50 psi and a high point of 125 psi.

Hot Bearing Oil—a temperature switch set at 200° F.

Low Motoring Oil Pressure—a pressure switch set at 2,500 psi.

Hot Motoring Oil—a temperature switch set at 250° F.

Rotor Vibration—a vibration alarm switch set a 1-g lateral acceleration.

Long Motor Time—LDC-40 controller provides a timer.

Low Alternator Voltage—a milliameter with an adjustable set point connected in series with a shunt across terminals of alternator.

Hot Field Coil—a temperature switch set at 220° F.

Brush Dragging—a milliameter with an 8-10-V set point connected across terminals of A-I-R HPG.

No HPG Voltage—same as Brush Dragging.

No HPG Current—a Rogowski coil set to trip a latching relay.

Overspeed RPM—set point on digital tachometer.

Figure 19A:
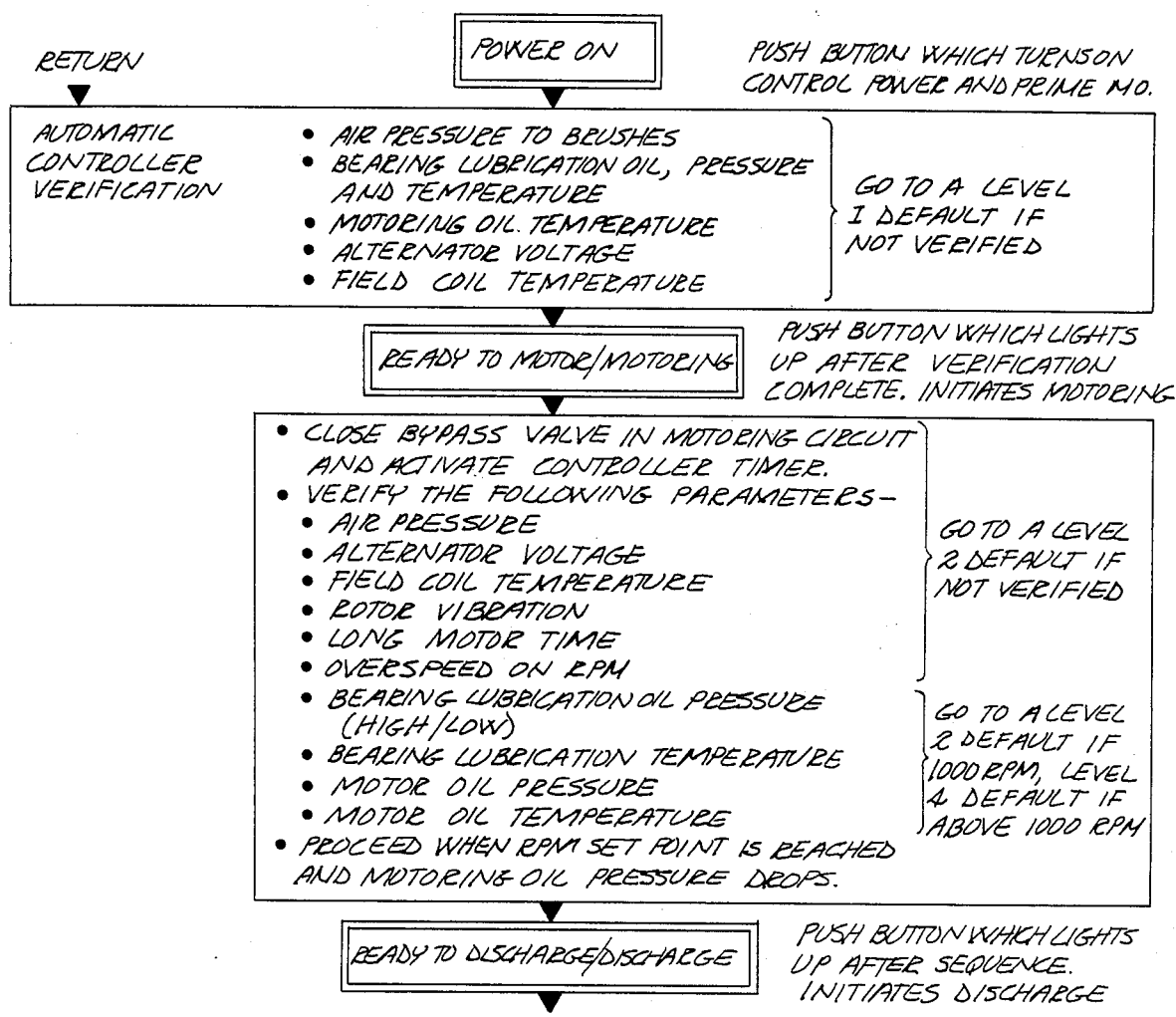
FIGS. 19a and 19b are flow charts of the control sequence for the HPG power supply.
Figure 19B:
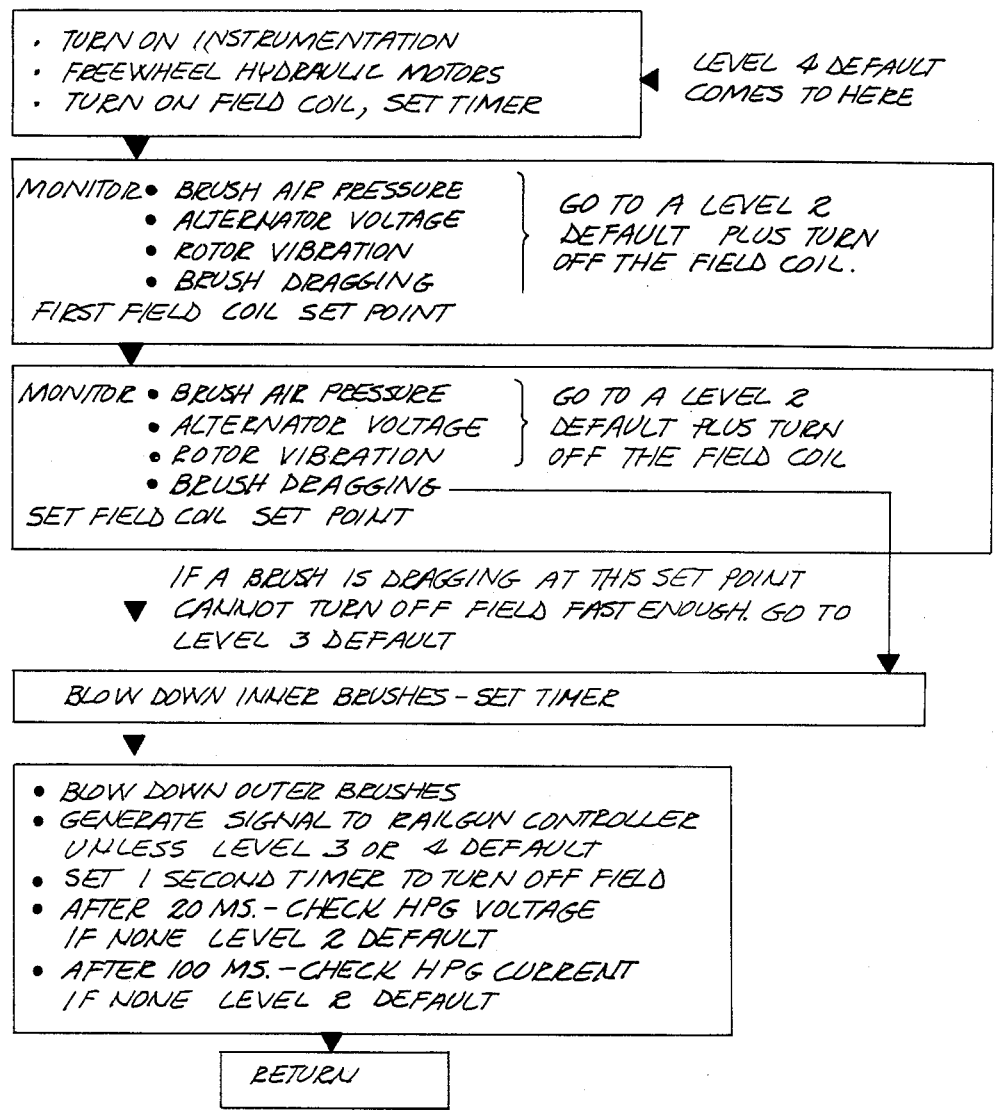

The operating control sequence carried out by logic controller 242 is set forth in the flow chart of FIG. 19. Default modes indicated on the controller flow chart are:

LEVEL 1
    Stand by
    Light up fault indicating on control panel
    Hold until clear LEVEL 2—Hydraulic motor brake. When stopped, go to Level 1

LEVEL 3—Reduced field discharge

LEVEL 4—Full field discharge

The foregoing description of the invention has been directed to a particular preferred embodiment for purposes of explanation and illustration. It will be apparent, however, to those skilled in this art that many modifications and changes in both the illustrated apparatus and the methods taught may be made without departing from the invention. It is applicants' intention in the following claims to cover all equivalent modifications and variations as fall within the scope of the invention.

What is claimed is:

1. A high-energy, high-current, field-portable pulsed power supply system comprising:
   a skid frame;
   a homopolar generator mounted on said skid frame; said homopolar generator comprising:
      a stator assembly including a stator ring and a field coil, for producing a stator magnetic field;
      a rotor separated into halves electrically insulated from one another and having a recess in the periphery thereof wherein said stator ring and field coil are disposed, for making two simultaneous voltage-generating passes through the stator magnetic field; and
      means for collecting electrical discharge current from said rotor;
   an auxiliary supply and drive system on said skid frame including a prime mover for providing operating power, and means for motoring the homopolar generator to speed; and
   a control system coupled to said homopolar generator and said auxiliary supply and drive system, for controlling the operation of said homopolar generator to obtain pulsed electrical power therefrom.

2. The system of claim 1 wherein said control system includes a logic controller for executing a prescribed sequence of steps including turning on the prime mover, initiating motoring of the homopolar generator, energizing the field coil, and initiating discharge of electrical current.

3. The system of claim 1 wherein said motoring means comprises a hydraulic motor coupled to the rotor of said homopolar generator.

4. The system of claim 3 wherein said auxiliary supply and drive system further includes a hydraulic circuit for controlling the operation of the hydraulic motor.

5. The system of claim 4 wherein said hydraulic circuit comprises:
   a hydraulic supply pump coupled to said prime mover, for supplying hydraulic fluid to said motor;
   a first hydraulic relief valve in line with said motor for braking same to a stop during a shut down operation;
   a hydraulic fluid reservoir; and
   a second hydraulic relief valve for bypassing the output of said supply pump to said reservoir, to permit freewheeling of said motor during discharge of said homopolar generator.

6. The system of claim 1 wherein said homopolar generator further comprises a bearing system for facilitating rotation of said rotor, and wherein said auxiliary supply and drive system further includes a bearing lubrication system for providing lubrication for the bearing system in said homopolar generator.

7. The system of claim 6 wherein said bearing lubrication system comprises:
   a lubricant supply pump driven by said prime mover, for supplying lubricant to said bearing system;
   a lubricant scavenge pump driven by said prime mover, for scavenging lubricant from said bearing system; and
   a lubricant reservoir coupled between said lubricant scavenge and supply pumps.

8. The system of claim 1 wherein said means for collecting electrical discharge current comprises:
   an inner brush mechanism disposed within the recess in said rotor and adjacent said field coil, for establishing electrical contact with inner slip-ring surfaces of said rotor halves; and
   an outer brush mechanism disposed outside the recess in said rotor, for establishing electrical contact with outer slip-ring surfaces of said rotor halves;
   each of said inner and outer brush mechanisms including a brush pad for contacting a respective rotor slip-ring surface, and a pneumatically-controlled actuator for advancing and retracting the brush pad with respect to the rotor surface.

9. The system of claim 8 wherein said auxiliary supply and drive system further includes a pneumatic control circuit for said brush actuators, said control circuit comprising:
   an air compressor pump driven by said prime mover, for supplying compressed air;
   a pressure regulator, for regulating the pressure of the supplied air;
   a compressed air accumulator, for storing a volume of compressed air; and
   an air control valve disposed between said accumulator and said brush actuators, for supplying compressed air on command.

10. A high-energy, high-current homopolar generator, comprising
   a support structure;
   a stator housed within said support structure for coupling a magnetic field therethrough;
   a field coil disposed adjacent and radially inward of the stator, for producing a stator magnetic field;
   a rotor carried in said support structure,
      said rotor having a recess in the periphery thereof for receiving therein stator and said field coil, and being split into halves insulated from one another for making two simultaneous voltage-generating passes through the stator magnetic;
   an inner brush mechanism disposed radially inward of the field coil, for contacting a surface of each rotor half inside the recess of said rotor to collect discharge current; and
   an outer brush mechanism carried by said support housing, for contacting a surface of each rotor half outside the recess therein to collect discharge current.

* * * * *